US010473263B2

(12) United States Patent
Conrardy

(10) Patent No.: US 10,473,263 B2
(45) Date of Patent: Nov. 12, 2019

(54) GIMBAL VIRATION ISOLATOR

(71) Applicant: Michael Conrardy, Milpitas, CA (US)

(72) Inventor: Michael Conrardy, Milpitas, CA (US)

(73) Assignee: Bao Tran

(*) Notice: Subject to any disclaimer, the term of this patent is extended or adjusted under 35 U.S.C. 154(b) by 0 days.

(21) Appl. No.: 15/853,739

(22) Filed: Dec. 23, 2017

(65) Prior Publication Data

US 2019/0195420 A1 Jun. 27, 2019

(51) Int. Cl.
*G03B 17/56* (2006.01)
*F16M 13/02* (2006.01)
*F16F 3/10* (2006.01)
*F16F 1/36* (2006.01)

(52) U.S. Cl.
CPC ............... *F16M 13/02* (2013.01); *F16F 1/36* (2013.01); *F16F 3/10* (2013.01); *G03B 17/561* (2013.01); *F16F 2224/025* (2013.01)

(58) Field of Classification Search
CPC .................. G03B 17/561; F16M 13/02
See application file for complete search history.

(56) References Cited

U.S. PATENT DOCUMENTS

| | | | |
|---|---|---|---|
| 4,685,649 A | 8/1987 | McKay | |
| 7,522,213 B2 | 4/2009 | Chapman | |
| 8,711,223 B2 | 4/2014 | Ellison | |
| 2013/0105619 A1* | 5/2013 | Buscher | B64D 47/08 244/17.11 |
| 2017/0037928 A1* | 2/2017 | Kronkright | F16F 7/01 |

* cited by examiner

*Primary Examiner* — Minh Q Phan
(74) *Attorney, Agent, or Firm* — Tran & Associates

(57) ABSTRACT

A device to support a camera includes first and second dampeners, each having a plurality of openings along a length of the dampener; first and second support pads secured to the first and second dampeners, respectively; and a rigid rope looping through the openings of the first and second dampeners to suspend the camera with minimal vibration pickup.

18 Claims, 5 Drawing Sheets

GIMBAL VIRATION ISOLATOR

Many companies have increasingly utilized the versatility of vehicles such as trucks or drones to film scenes such as vista or panorama views, automobile action shots and zoom close-up shots of characters on the ground for added visual effects. However, as filming platforms, these vehicles have significant vibrations emitted when moving or even when operating in a stationary position. The motion of the truck during driving or drone while in flight causes vibrations which are transmitted to the camera which results in a fuzzy exposed film, or tape, or a poorly shot scene because of the jerking effect or the vibration caused by the underlying movement of the vehicle.

SUMMARY

In a first aspect, a device to support a camera includes first and second dampeners, each having a plurality of openings along a length of the dampener; first and second support pads secured to the first and second dampeners, respectively; and a rigid rope looping through the openings of the first and second dampeners to suspend the camera with minimal vibration pickup.

In a second aspect, a method to isolate vibrations on a camera includes forming an array of holes along the length of first and second dampeners; securing first and second support pads to the first and second dampeners, respectively; and looping a rigid rope through the openings of the first and second dampeners to suspend the camera with minimal vibration pickup.

In a third aspect, a camera system includes a gimbal mount for a camera; and a plurality of suspension devices coupled to the gimbal mount. In the system of FIG. 5, each suspension device has first and second dampeners, each having a plurality of openings along a length of the dampener; first and second support pads secured to the first and second dampeners, respectively; and a rigid rope looping through the openings of the first and second dampeners to suspend the camera with minimal vibration pickup.

Advantages of the vibration isolator may include one or more of the following. The system isolates vibrations and movements to enable movies or pictures to be taken without the negative effects of vibration. The vibration isolation device allows a photograph to be taken with no blurring even on occurrence of such a camera movement on a release of a shutter, and allows a video to be taken without visible artifacts caused by vibration. The system provides an effective, space-efficient, and low cost approach to vibration isolation for stabilization of a vehicle-mounted camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 shows a top view of the isolator of FIG. 1, while

DETAILED DESCRIPTION

Figure 1:
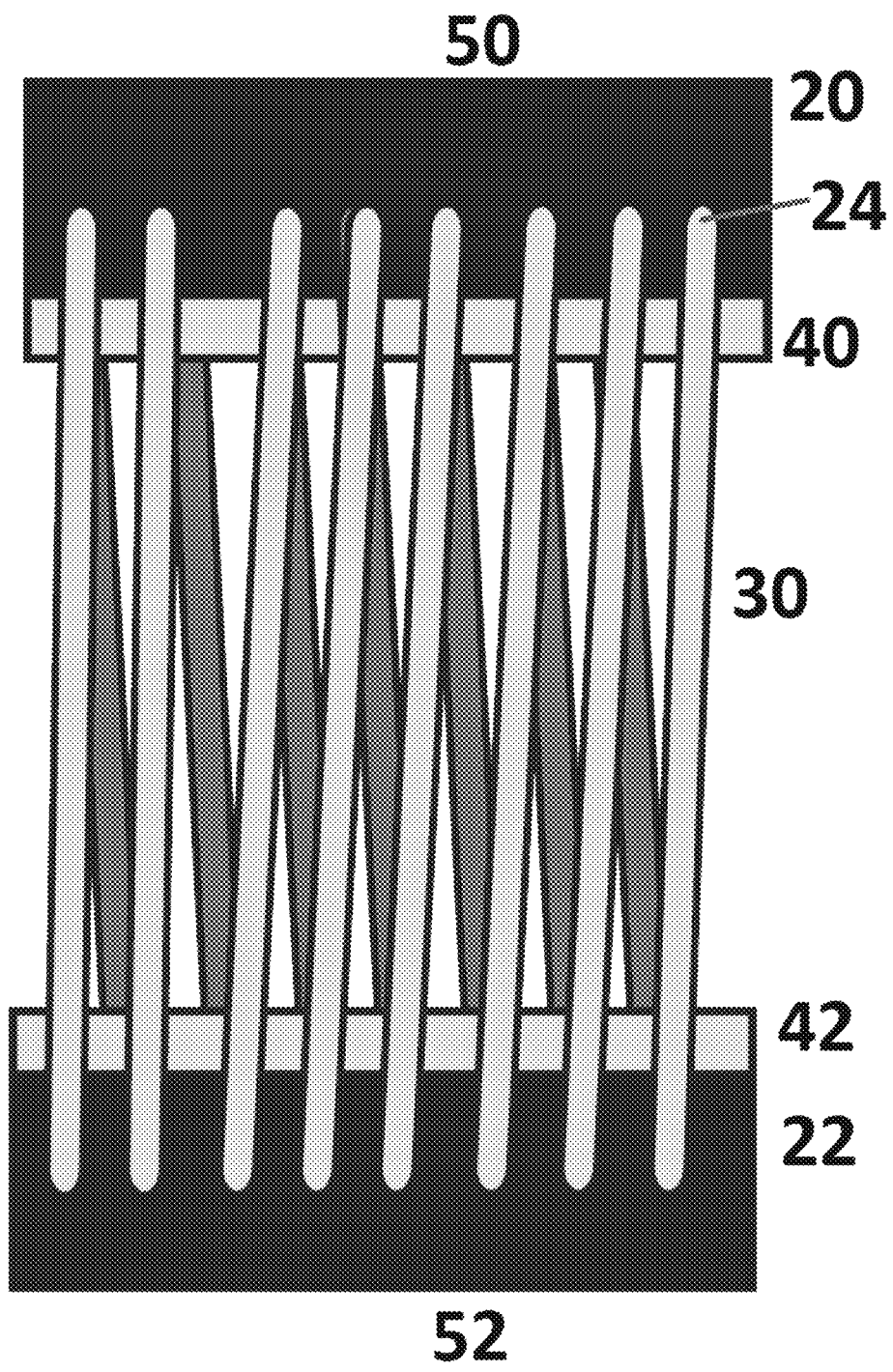
FIG. 1 shows an exemplary side view of a gimbal vibration isolator.

FIG. 1 shows an exemplary side view of a gimbal vibration isolator. The isolator has first and second dampeners 20 and 22. In one embodiment, the dampeners 20-22 can be rubber pads or elastomers. The dampeners 20-22 has a plurality of openings 24 along the length of each dampener to receive a multi-strand rope 30. The rope 30 can be a metal rope, among others. Each dampener 20 or 22 has one face secured to a metal support pad 40 or 42, respectively. The other face of dampener 20 or 22 is glued or otherwise secured to a mounting surface. The support pad 40 or 42 in turn has holes to receive mounting screws to secure the isolator to two mounting surfaces 50 and 52, respectively. The mounting surface 50 can be an attachment to a camera mount, and the mounting surface 52 can be an attachment to a vehicle, among others.

Figure 2:
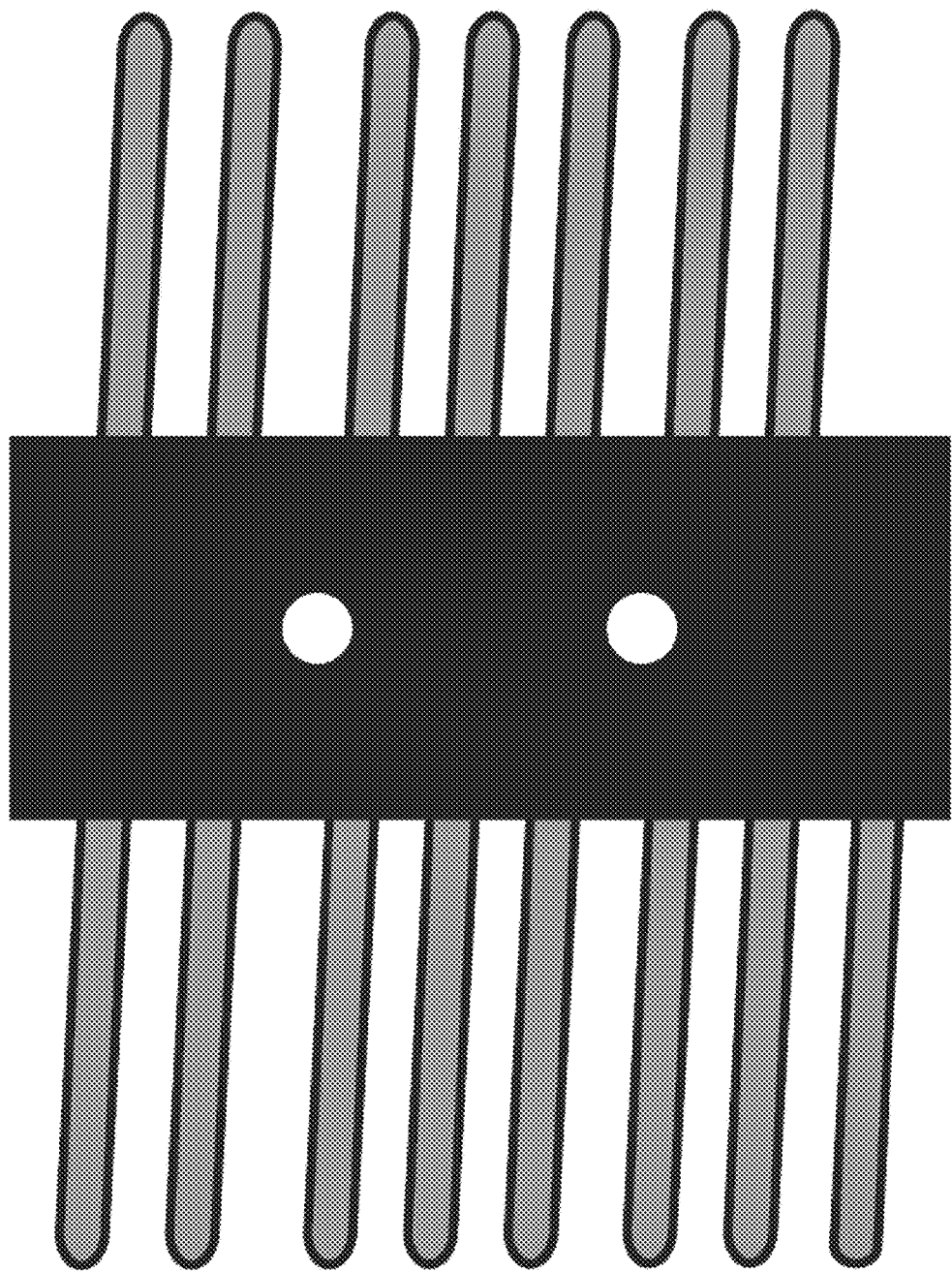

FIG. 2 shows a top view of the isolator of FIG. 1. As shown in the top view, the rope or cable 30 are angled relative to the pads 40 or 42. However, it is contemplated that the rope or cable 30 can be perpendicular to the pads 40 or 42, among others.

Figure 3:
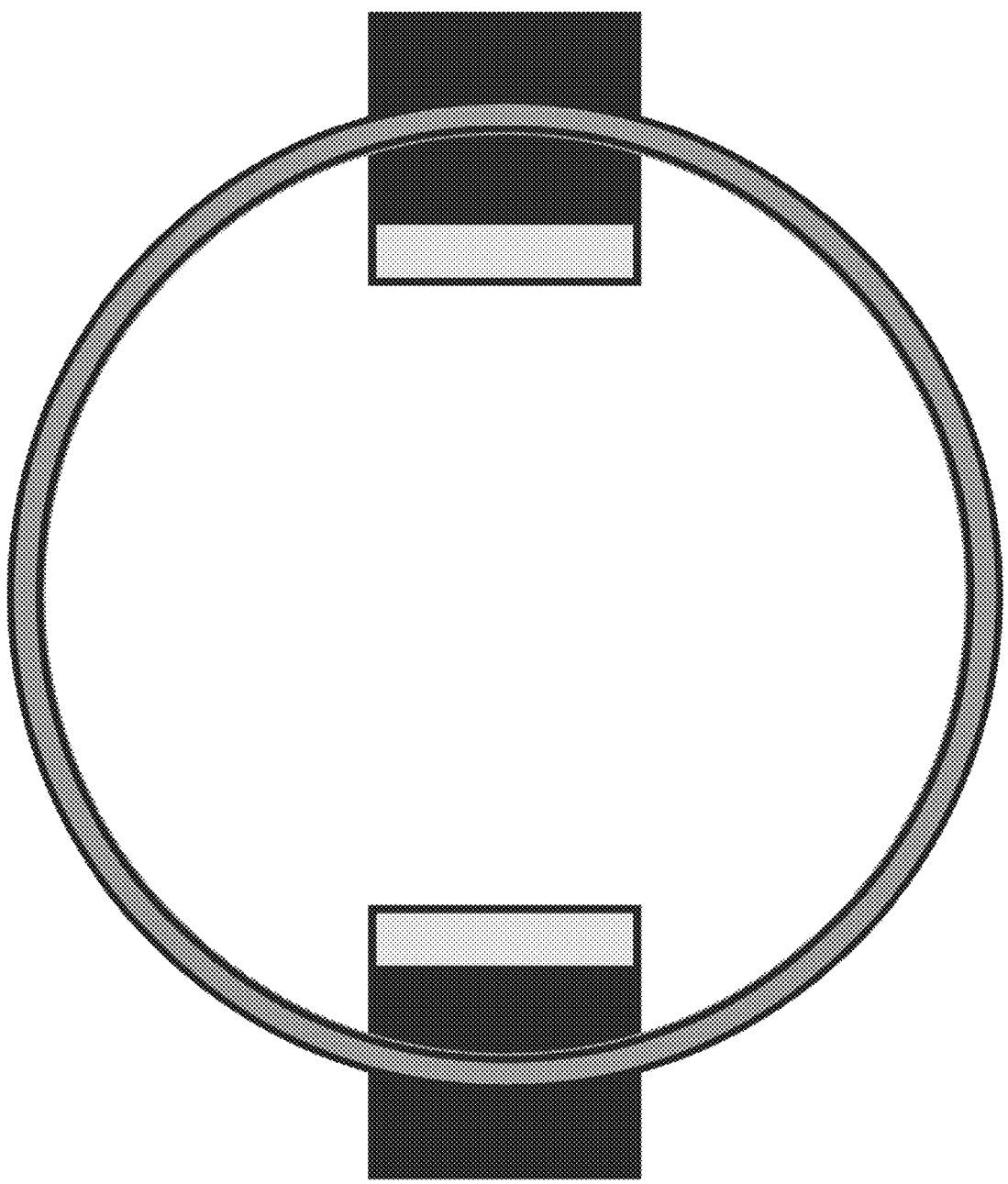
FIG. 3 shows a midline cut end view of the isolator of FIG. 1.

FIG. 3 shows a midline cut end view of the isolator of FIG. 1. As shown in the end view, the rope or cable 30 is rigid and forms a circular shape. However, it is contemplated that the rope or cable 30 can be oval shaped or shaped in any suitable manners.

Figure 4:
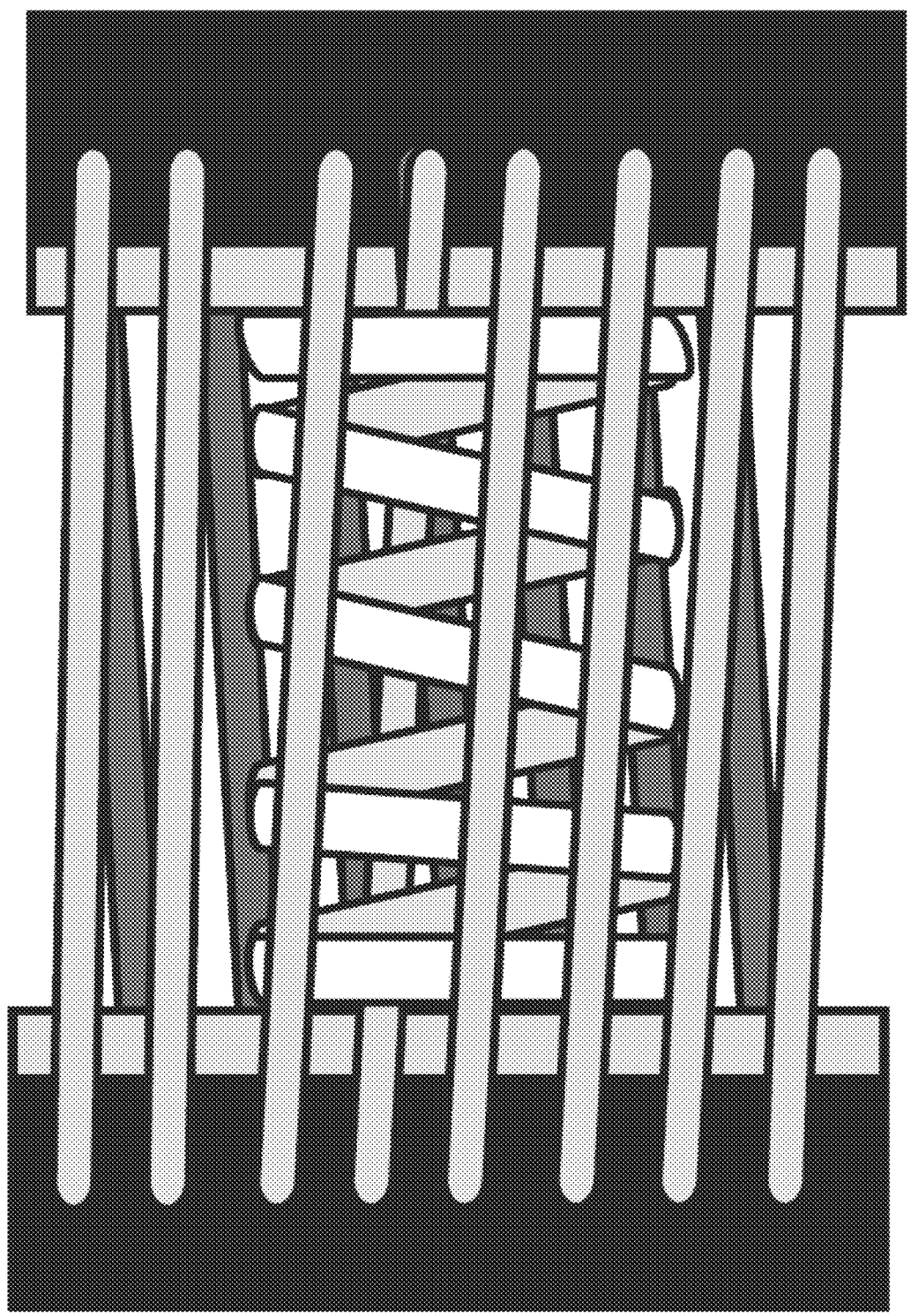
FIG. 4 shows a second embodiment of a gimbal vibration isolator, with an optional inner spring.

FIG. 4 shows a second embodiment of a gimbal vibration isolator, with an optional inner spring 60. The spring further dampens movements between the two dampeners 20 and 22.

Figure 5:
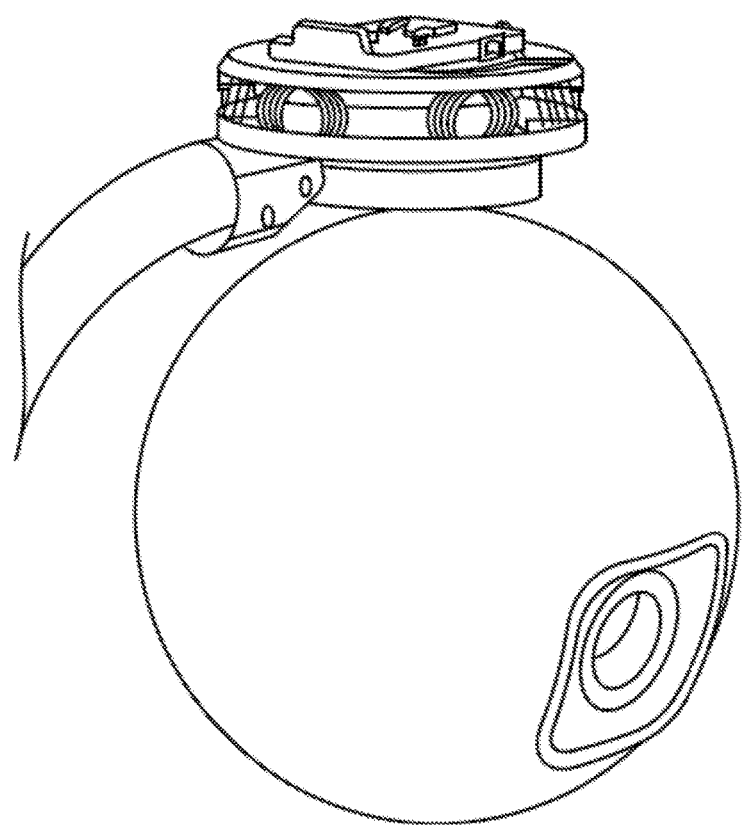
FIG. 5 shows a gimbal mount system using a plurality of suspension devices of FIG. 1.

FIG. 5 shows an exemplary suspension system for a gimbal camera mounting system. A gimbal is a pivoted support that allows the rotation of an object about a single axis. A set of three gimbals, one mounted on the other with orthogonal pivot axes, may be used to allow an object mounted on the innermost gimbal to remain independent of the rotation of its support (e.g. vertical in the first animation). For example, on a ship, the gyroscopes, shipboard compasses, stoves, and even drink holders typically use gimbals to keep them upright with respect to the horizon despite the ship's pitching and rolling.

As can be seen in FIG. 5, the camera system includes a gimbal mount for a camera; and a plurality of suspension devices coupled to the gimbal mount. In the system of FIG. 5, each suspension device has first and second dampeners, each having a plurality of openings along a length of the dampener; first and second support pads secured to the first and second dampeners, respectively; and a rigid rope looping through the openings of the first and second dampeners to suspend the camera with minimal vibration pickup.

The foregoing vibration isolator can isolate the camera from a source of vibrations by reducing or eliminating transmission of vibrations from the source to the object, generally by attenuating the amplitude of the vibrations. The isolation device may operate in a frequency-dependent manner, to selectively attenuate some frequencies of vibration more than others. In some cases, the isolation device(s) alone or in combination with the object may have a natural frequency at which vibrations are amplified. Vibrations substantially above (and/or below) the natural frequency may be attenuated or eliminated. The natural frequency may be selected to be significantly below (and/or above) the primary driving frequency (or frequencies) of the source of vibration.

The isolation device may have any suitable structure. The device may comprise a body and, optionally, a bracket attached to the body. The body may be an elastomeric body, that is, a body composed of one or more elastomers. Alternatively, or in addition, the isolation device may be characterized as a combination of an elastic element (a spring) and, optionally, a damper. The damper may be integral to the elastic element or may be a separate component(s)/material(s).

Thus, a novel and shock and vibration isolator for a camera has been shown and described. It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure. Various changes and modifications may of course be made without departing from the spirit and scope of the invention. The invention, therefore, should not be limited, except by the following claims and equivalents thereof.

What is claimed is:

1. A device to support a camera, comprising
   first and second dampeners, each having a plurality of openings along a length of the dampener;
   first and second support pads secured to the first and second dampeners, respectively; and
   a coiled rigid rope looping through the openings of the first and second dampeners to suspend the camera with minimal vibration pickup and an inner spring orthogonal to the coiled rigid rope.
2. The device of claim 1, wherein each dampener comprises an elastomeric or rubber portion.
3. The device of claim 1, wherein each dampener comprises a pad with one or more holes to receive mounting screws.
4. The device of claim 3, wherein the one or more holes extend from the pad through the dampener.
5. The device of claim 1, wherein the coiled rigid rope forms circular loops when threaded through the openings.
6. The device of claim 1, wherein the coiled rigid rope forms oval loops when threaded through the openings.
7. The device of claim 1, wherein the coiled rigid rope comprises a metal rope.
8. The device of claim 1, wherein the coiled rigid rope forms angled loops relative to the dampeners.
9. The device of claim 1, comprising a gimbal coupled to one of the dampeners.
10. The device of claim 1, wherein one of the dampeners is mounted to a moving vehicle.
11. The device of claim 10, wherein the moving vehicle comprises a car, a truck, a boat, or a drone.
12. A method to isolate vibrations on a camera, comprising:
    forming an array of holes along the length of first and second dampeners;
    securing first and second support pads to the first and second dampeners, respectively; and
    looping a coiled rigid rope through the openings of the first and second dampeners to suspend the camera with minimal vibration pickup, wherein the coiled rigid rope loops through the openings of the first and second dampeners to suspend the camera with minimal vibration pickup and an inner spring orthogonal to the coiled rigid rope.
13. The method of claim 12, wherein each dampener comprises an elastomeric or rubber portion.
14. The method of claim 12, wherein each dampener comprises a pad with one or more holes to receive mounting screws and wherein the one or more holes extend from the pad through the dampener.
15. The method of claim 12, comprising forming the coiled rigid rope as circular loops or oval loops when threaded through the openings.
16. The method of claim 12, wherein the coiled rigid rope comprises a metal rope.
17. The method of claim 12, comprising forming angled loops relative to the dampeners with the coiled rigid rope.
18. A system, comprising:
    a gimbal mount for a camera; and
    a plurality of suspension devices coupled to the gimbal mount, each suspension device comprising:
      first and second dampeners, each having a plurality of openings along a length of the dampener;
      first and second support pads secured to the first and second dampeners, respectively; and
      a coiled rigid rope looping through the openings of the first and second dampeners to suspend the camera with minimal vibration pickup and an inner spring orthogonal to the coiled rigid rope.

* * * * *